United States Patent Office 3,730,743
Patented May 1, 1973

3,730,743
ZINC DUST COATING COMPOSITION
Gordon Donald McLeod, Adrian, Mich., assignor to Stauffer Chemical Company
No Drawing. Continuation of application Ser. No. 768,208, Oct. 4, 1968, which is a continuation of application Ser. No. 484,768, Sept. 2, 1965. This application Aug. 24, 1970, Ser. No. 66,608
Int. Cl. C09d 5/10
U.S. Cl. 106—1  5 Claims

ABSTRACT OF THE DISCLOSURE

A coating composition containing particulate zinc and a vehicle consisting of an alkyl polysilicate and an organic solvent.

---

This application is a continuation of application Ser. No. 768,208, filed Oct. 4, 1968, which is a continuation of application Ser. No. 484,768, filed Sept. 2, 1965, both now abandoned.

This invention relates to a novel composition particularly useful as applied to bind particulate solids such as metal dusts, metallic oxides, inorganic silicates and the like. Such composition has been found particularly valuable in the preparation of zinc dust coating and will be specifically described in that connection.

The binder composition herein is based on a tetraalkoxy silane of the formula

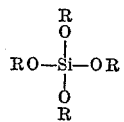

where any of R may be an alkyl radical of not more than 4 carbon atoms i.e. methyl, ethyl, propyl, isopropyl, butyl, and isobutyl.

It is required that the tetraalkoxy silane before use for the purposes of the invention be prehydrolyzed and condensed to an extent such that the $SiO_2$ content of the condensate is at least about 35% on a molecular weight basis. Particularly good results have been attained with a condensate containing of the order of 40% $SiO_2$.

Any of the prehydrolyzates or condensates applicable to the invention may be prepared by hydrolyzing the corresponding tetraalkoxy silane which may itself be readily produced by reaction of silicon tetrachloride and the corresponding alkanol viz:

$$SiCl_4 + 4ROH \rightarrow Si(OR)_4 + 4HCl$$

Alternatively and preferably, the condensed material is prepared by carrying out the above reaction in the presence of sufficient water to achieve the desired $SiO_2$ content in the product. To illustrate in the simplest way:

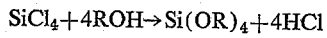

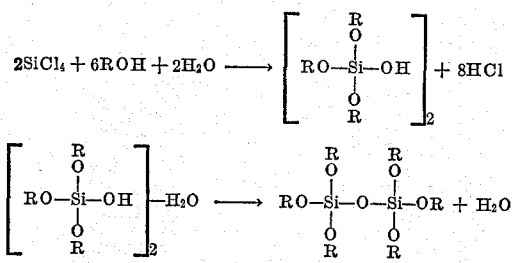

This siloxane product, of course, does not yet contain an amount of silica ($SiO_2$) as required according to the invention. To achieve such content of silica, one has only to employ in the reaction an additional increment of water gauged with reference to the desired silica content and to allow the reaction to continue longer under controlled conditions already known in the art. Using the proper amount of water, the reaction, which is one of further condensation, is self-perpetuating:

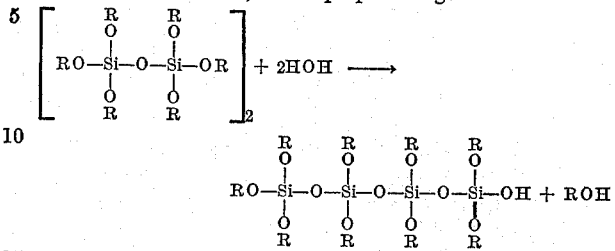

The above silalkoxy hydroxide will of course condense with itself with splitting out of water and the formation of an 8-silicon atom dimer which in the presence of the water will hydrolyze. Thus, the hydrolysis and condensation continues until the reaction is stopped by known means or until a material results which is non-hydrolyzable under the particular conditions.

It is to be understood that the hydrolysis and condensation reactions may proceed with the formation of cyclic and cross-linked structures as well as linear structures, which are employed in the equations supra in the interest of simplicity.

In general, it is preferred to employ in the practice of the invention a condensate based on tetraethoxy silane i.e. a condensate of tetraethyl orthosilicate, and as previously suggested, particularly excelent results are achieved if the tetraethoxy silane condensate has an $SiO_2$ content of the order of 40% (molecular basis). This preferred condensate averages out to the following formula for the various compounds contained therein:

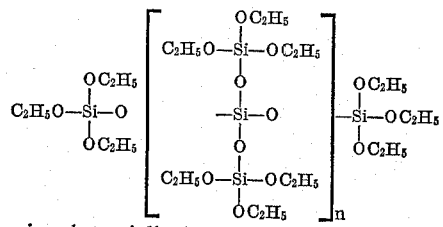

where $n$ is substantially 1.

The binder herein is prepared by mixing the tetraalkoxy silane condensate of the selected $SiO_2$ content with additional water and a solvent from the class consisting of monoalkylene glycol monoalkyl ethers, dialkylene glycol monoalkyl ethers, dialkylene glycol dialkyl ethers and monoalkylene glycol dialkyl ethers which are miscible with water and which have boiling points within the range 250° F. to 300° F. and flash points within the range 115° F. to 165° F.

The water mixed with the tetraalkoxy silane condensate and the solvent in the preparation of the binder should contain acid in an amount sufficient to give the mixture a pH of the order of 1.4–3.5. Hydrochloric acid is generally employed but other mineral acids as $H_2SO_4$ may be used, either alone or in conjunction with HCl. Also, organic acids possessing the requisite strength can be employed as can be metal chlorides, nitrates and sulfates, where the metal is a member of Group II or IV of the Periodic Table. The purpose of the acid is to catalyze the further hydrolysis of the precondensed tetraalkoxy silane. From the foregoing it should not be taken that any criticality attaches to the addition of the acid through the medium of the water employed. It is merely more convenient to add the acid in this manner.

The tetraalkoxy silane condensate and solvent are best precombined before addition of the acidified water.

The degree of further hydrolysis of the tetraalkoxy silane condensate resulting upon addition of the acidified water to the solvent mixture may lie anywhere within the range 0.15 mole to 0.5 mole H$_2$O per each alkoxy group carried by the tetraalkoxy silane condensate.

The solvent to condensate ratio is subject to wide variation depending on the characteristics desired in the finished binder. Thus, the ratio may lie anywhere within the limits 0.5:1 to 10:1.

To recapitulate at this stage, it may be stated that a binder composition conforming to the invention (as freshly prepared) comprises a precondensed tetraalkoxy silane having a silica content at least about 35%, water in an amount gauged to provide 0.15 to 0.5 mole of H$_2$O for each alkoxy group present in the tetraalkoxy silane condensate and a solvent from the previously defined class, the same being present in the ratio immediately above indicated.

Mention should be made of the fact that the solvent may represent a mixture of ethers from the defined class. Also, as a matter of economics it may be considered desirable to extend the solvent with one or more solvents of relatively lower cost. Hydrocarbon solvents are in general adapted for use as extenders, but should not account for more than 20% of the total volume of the solvent.

Following the preparation of the binder, the same is normally allowed to age before use. For any given composition, the aging, which is accompanied by the taking-up of substantially all of the water by the condensate, is a function primarily of time and temperature, which is to say that the higher the temperature, the shorter the aging time and vice versa. Different compositions may require different periods of aging at any given temperature, or assuming a given period, different temperatures may be required. The aging process, like the pre-combining of the tetraalkoxy silane condensate and the solvent, is best carried out in closed system.

A binder conforming to the invention displays highly desirable properties unattainable with conventional binder materials. Thus, the binder exhibits high stability for long periods, in many instances, up to 3–4 years.

As applied in the production of zinc dust coatings, the binder yields coatings which are unusually long lasting and resistant to corrosion. These desiderata result from actual reaction of the zinc with the silica-containing component of the binder.

Frequently, it is desirable to employ in lieu of pure zinc, a mixture of zinc dust with a suitable filler such as calcium and/or magnesium meta silicate or minerals containing same. Here, reaction of the tetraalkoxy silane condensate with the zinc-filler mixture yields a complex comprising both the metal of the silicate and zinc.

The coatings herein display excellent adhesiveness on application. Indeed, it has been found that in many cases the coating may be applied successfully to clean steel surfaces without prior sand-blasting, which is not possible with the prior coatings. Good adherence to damp and even wet steel or galvanized surfaces has been achieved. The coating will not freeze, nor is it in anyway adversely affected by bright sunlight at tropical temperatures.

A coating conforming to the invention is readily produced to have a flash point of as high as 100° F. (Tag open cup method) and a pot life meeting the requirements of substantially any field of use.

If desired, the coating can be heat-cured in a baking oven at temperatures as high as 700–800° F. At such temperatures the cure is effected in no more than 10 seconds. Lower temperatures demand relatively longer cure periods.

An advantage of the coating of significance, particularly, in factory use resides in its ability to adhere to previously slightly oiled surfaces.

The coating shows excellent resistance to salt spray and to fuels and organic solvents. It is easily pigmented, hence can be employed without an overcoat.

The zinc-binder ratio is largely a matter of customer preference or of the specifications to be met. In general, more binder is required where a filler such as the previously-mentioned calcium and magnesium meta silicates are used. Thus, in this instance the binder to particulate ratio may go as high as 70:30 on a weight basis. In general, fibrous mineral fillers are preferred e.g. asbestos, fibrous talc, fibrous calcium meta-silicate, etc. Apart from these materials, gypsum has application in several fields of use.

If a filler is not employed, the binder-zinc ratio normally lies within the range 50:50–10:90.

Among many suitable coloring pigments for the coating may be mentioned: iron oxide, cadmium sulfide, titanium oxide and most of the lithopones.

The invention is further illustrated by the following examples which are not to be taken as in anyway limitative thereof.

EXAMPLE I

Formulation: Parts (by wgt.)
1½% solution of HCl in distilled water ____ 3.36
Ethylene glycol monoethyl ether (anhydrous) _____ 50.64
Ethyl polysilicate (40% SiO$_2$) _____ 45.00

The HCl solution was added to the previously combined ethylene glycol monoethyl ether and ethyl polysilicate at room temperature (25° C.). The resulting mixture, which had a pH of 1.8, was allowed to stand for one day, after which time it was ready for use as evidenced by an increase in the SiOH content of the condensate. In an accelerated test, the binder had a shelf-life of over four months (62° C.).

EXAMPLE II

The binder composition of Example I was mixed with zinc dust (2–6 microns) in a ratio of 60 parts binder to 40 parts zinc dust and in a ratio of 80 parts binder to 20 parts zinc dust to form two coating compositions, each of which was applied to a lightly sand-blasted steel substrate. The coating adhered well, passed the standard salt spray test and showed a shelf-life of over two years as extrapolated from data developed from an accelerated test carried out at 60–65° C. The flash point was 78° F.

EXAMPLE III

A batch of precondensed ethyl orthosilicate containing 40 percent SiO$_2$ was topped to remove monomeric tetraethyl orthosilicate and potential alcohol. The SiO$_2$ content of the topped material (distillate) was 48%. Used as described in Example II the material on hydrolysis to an equivalent degree gave an equivalent coating, with a flash point even higher (98° F.–TOC).

EXAMPLE IV

An ethylene glycol monoethyl ether solution of condensed polymers of tetramethyl orthosilicate, tetraethyl orthosilicate and tetraisopropyl orthosilicate were hydrolyzed in the usual manner with the appropriate amount of water. These polymers had an SiO$_2$ content upwards of 35%.

The resulting binder provided a zinc coating equivalent to the coatings of Example II. The flash point was of the order of 70° F. (TOC).

EXAMPLE V

An ethylene orthosilicate condensate having an SiO$_2$ content of 40% was heated to boiling with 10 parts of methanol. The resultant disproportionated silicate material was hydrolyzed in the usual manner in mixed ethers to provide a binder which when loaded with zinc in the ratio 40:60 yielded a coating which was found to be unusually fast curing. The flash point on this coating was about 60° F. It was evident that the fast cure resulted from conversion of a portion of the ethoxy groups carried by the condensate to methoxy groups.

EXAMPLE VI

To 100 parts of binder as described in Example I was added 250 parts of zinc dust and 25 parts of a mixed calcium-magnesium-aluminum silicate having a particle size averaging .8 micron. After mixing, the slurry was applied to a sand-blasted iron surface. The coating hardened to a 2H hardness in 20 hours. It had excellent salt spray resistance even after 3,000 hours (ASTM).

EXAMPLE VII

To 125 parts of binder as described in Example I was added with stirring 250 parts of zinc dust, 70 parts talc (asbestone 625—a fibrous magnesium and calcium silicate mineral having a particle size of 2 microns) and 10 parts ZBS red iron oxide. The resultant slurry was applied to a clean steel surface. It adhered well, hardened in 24 hours, and behaved excellently in the salt spray test (3,000 hours—2 mil coat).

EXAMPLE VIII

To 100 parts of binder as described in Example I was added 100 parts of micro velva A (mixed calcium-magnesium-aluminum silicates having an average particle size of less than 1 micron) and 10 parts of red iron oxide. After mixing, the slurry was applied as a top coat over the silicate coating of Example V. The top coating adhered well, was porous, protective and colorful. It improved salt spray resistance.

The invention claimed is:

1. A coating composition comprising particulate zinc and a binder consisting of a condensate of a compound conforming to the formula

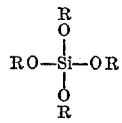

in which R represents a straight chain alkyl radical of not more than four carbon atoms, said condensate having an $SiO_2$ content of at least about 35 percent, water in an amount sufficient to provide 0.15 to 0.5 mole of $H_2O$ for each alkoxy group carried by said condensate, acid in an amount providing a pH of the order to 1.5–3.5 and a solvent from the class consisting of monoalkylene glycol monoalkyl ethers, dialkylene glycol monoalkyl ethers, dialkylene glycol dialkyl ethers and monoalkylene glycol dialkyl ethers having boiling points within the range 250° F. to 300° F. and flash points within the range 115° F. to 165° F., the solvent-condensate ratio on a weight basis lying within the limits 0.5:1 to 10:1, the binder to zinc ratio being in the range of from 50:50–10:90 on a weight basis.

2. The coating composition of claim 1 which includes a particulate filler material in addition to the zinc, the total ratio of binder to particulates being in the range of from 70:30–10:90 on a weight basis.

3. The coating composition of claim 2 where the filler material is an alkaline earth metal silicate comprising calcium and/or magnesium.

4. The coating composition of claim 2 where the filler material is a fibrous mineral substance.

5. The coating composition of claim 1, wherein the condensate averages out to the following formula:

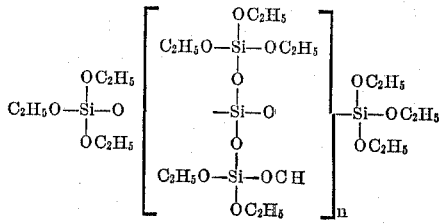

where $n$ equals substantially 1.

References Cited

UNITED STATES PATENTS

| | | | |
|---|---|---|---|
| 3,056,684 | 10/1962 | Lopata | 106—14 |
| 3,202,517 | 8/1965 | Jarboe | 106—14 |
| 3,368,928 | 2/1968 | Chadha et al. | 117—135.1 |
| 3,392,130 | 7/1968 | Rucker et al. | 106—14 X |

LORENZO B. HAYES, Primary Examiner

U.S. Cl. X.R.

106—14, 287 SE; 117—131, 135.1